March 26, 1963 F. C. G. VAN BAERLE 3,082,546
NUCLEAR REACTOR SIMULATOR
Filed June 22, 1960

United States Patent Office 3,082,546
Patented Mar. 26, 1963

3,082,546
NUCLEAR REACTOR SIMULATOR
Frederic Charles Gerard van Baerle, 41 Surinamestraat,
The Hague, Netherlands
Filed June 22, 1960, Ser. No. 37,946
Claims priority, application Netherlands June 26, 1959
8 Claims. (Cl. 35—10)

The invention relates to a nuclear reactor simulator and in particular to a simulator which displays the behaviour of a nuclear reactor in a very illustrative manner and which is therefore excellently suited as a demonstrating model for educational purposes.

There already exist a number of nuclear reactor simulators which simulate even the finest details of the behaviour of a nuclear reactor. These simulators are used in laboratories in order to verify the behaviour of a nuclear reactor under various circumstances and offer the advantage that by means of these simulators it is possible to carry out experiments which, if carried out with a real nuclear reactor would have disastrous results. These simulators comprise a computer which is provided with all functions which occur in a real nuclear reactor and are therefore very expensive, whereby their employment as demonstrating models or educational devices is not feasible. Further the results are displayed in a very dry way, which does not appeal at all to the relative layman.

Accordingly, it is an object of the present invention to provide a nuclear reactor simulator which is very inexpensive and which nevertheless simulates the behaviour of a nuclear reactor reasonably accurately and represents the results in a very illustrative way.

In order to achieve this purpose a nuclear reactor simulator according to the invention is characterized by a transistor in a circuit with small thermal stability, said transistor being exposed to the heat of an adjustable heat source, the output signal of said transistor being supplied to a meter which is calibrated in units of activity of a nuclear reactor and/or to other means whereby the degree of activity of a nuclear reactor is displayed visually.

This and other features of the invention will become apparent from the following description and accompanying drawing, in which.

Figure 1:
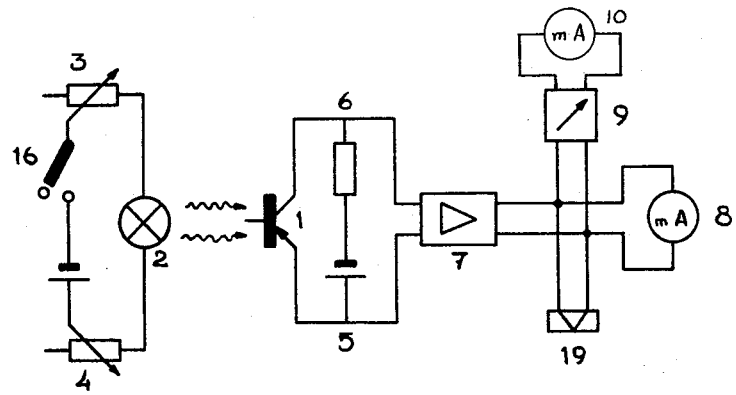
FIGURE 1 is a circuit diagram of a simulator circuit according to the present invention.

The invention is based on the insight, that the behaviour of a transistor in a thermally rather unstable circuit bears a marked similarity to the behaviour of a nuclear reactor. The proper analogue for the nuclear reactor consists therefore of a transistor 1 (see FIGURE 1) and an incandescent lamp or other heat source 2 which is disposed in the immediate vicinity of the transistor. As the base electrode of the transistor is open-circuited the transistor is thermally highly instable.

The heat production of the incandescent lamp can be adjusted by means of two adjustable resistors 3 and 4, the purpose of which shall be explained later on. As no current is supplied to the base electrode of the transistor the transistor will carry only a small leakage current, whereby the voltages between points 5 and 6 is relatively high. The leakage current, however, is strongly dependent upon the temperature and increases exponentially with the temperature of the collector-base junction. This temperature in its turn is dependent upon the collector dissipation and the heat which is supplied from the outside. If the leakage current exceeds a certain magnitude the collector dissipation is thereby increased to such an extent, that the increase of the leakage current which is caused thereby is sufficient to further raise the temperature of the junction, whereby the transistor runs out of control, which is very similar to the way in which a nuclear reaction builds up in a nuclear reactor. The intensity of the nuclear reaction can therefore be symbolized by the leakage current of the transistor.

The collector-emitter voltage between the points 5 and 6, which is dependent upon the leakage current, is amplified in an amplifier 7, which supplies its output to a milliammeter 8. This meter can be calibrated in units of neutron flux density or generated power or other terms in which the intensity of a nuclear reaction can be expressed. The output signal of the amplifier 7 is through a compensating circuit 9 also supplied to a much more sensitive meter 10. By means of the compensating circuit 9 the pointer of the meter 10 can be kept within the limits of the scale of the meter 10, regardless of the magnitude of the output signal of the amplifier 7, while the movements of the pointer indicate the rising or falling of the intensity of the simulated nuclear reaction very accurately.

Figure 2:
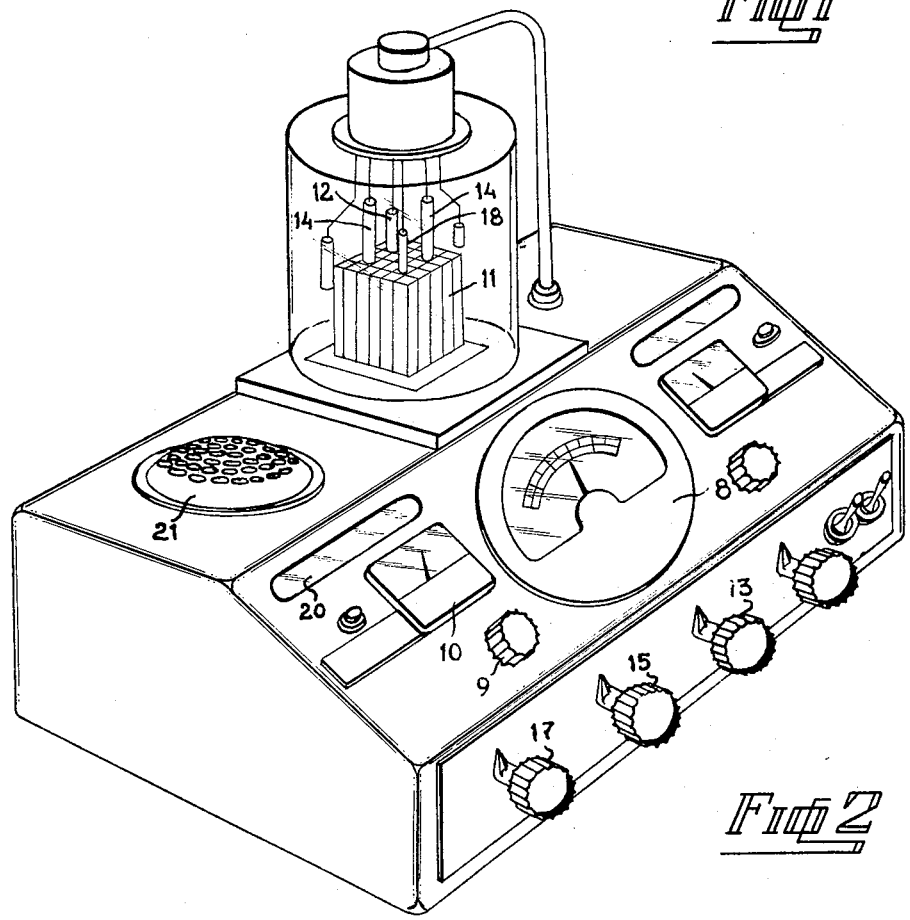
FIGURE 2 is a perspective view of a simulator according to the present invention.

In order to illustrate the simulated process as clearly as possible the simulator is provided with a model 11 of a nuclear reactor (see FIGURE 2). The screening 12 of the adjustable neutron source, by means of which a nuclear reactor is usually started, can be pushed in and out by means of a control knob 13. This knob is also connected to the adjustable resistor 3, in a way which is hidden from the view of a spectator. The safety rods 14 of the reactor can be lifted by means of a control knob 15. This knob actuates also a switch 16, which is closed when the safety rods are lifted, whereby the circuit of the incandescent lamp 2 is closed. If the screening 12 is lifted the resistance of the adjustable resistor 3 is decreased, so that the lamp 2 supplies some heat to the transistor 1. Leakage current of same is thereby increased somewhat, which, however, is hardly noticeable and certainly does not cause the transistor to run out of control.

The leakage current, however, can be further increased by rotation of the control knob 17, by means of which the control rods 18 of the reactor can be pushed in and out. The control knob 17 is connected to the resistor 4 in a way which is hidden from the spectator's view and the resistance of the resistor 4 is decreased as the control rods 18 are lifted. Thereby the current through the lamp 2 and the heat which is supplied to the transistor can be increased to such an extent, that the leakage current increases spontaneously, which corresponds to the situation of a nuclear reactor which has run out of control. As soon as the leakage current exceeds a magnitude which corresponds to a nuclear reaction of dangerous intensity in a real nuclear reactor the output signal of the amplifier 7 energizes a relay 19, whereby the safety rods 14 are released and are pushed into the reactor 11, for instance by means of springs, whilst also an alarm system is operated, which may for example comprise an optical signal 20 and a siren 21. When the safety rods 14 are pushed into hte reactor the switch 16 is opened, whereby the circuit of the lamp 2 is opened. The ambient temperature in the transistor 1 now decreases gradually, whereby the transistor 1 cannot maintain its collector current at its previous value, so that the circuit returns to its initial state.

In order to increase the suggestion of the reactor model 11 the lamp 2 can be so positioned under the reactor model 11 and can be provided of such colour filters that around the reactor model 11 a glow occurs which is similar to the Tcherenkow-radiation of a real swimming pool reactor. The extent to which the lamp current influences the transistor can be adjusted by varying the distance of the lamp 2 from the transistor 1. The thermal lag can be adjusted by varying the position of the transistor 1 with respect to the lamp 2. If the transistor 1 is positioned side by side with the lamp 2 it is exposed nearly exclusively to the heat radiation which has negligible lag, whereas if the transistor 1 is positioned above the lamp 2 it is also exposed to the heat convection, which has a considerable lag.

Many variations of the embodiment described are feasible. For instance it is possible to provide interlocks which prevent the screening of the neutron source and/or the safety rods and/or the control rods from being raised if the amplifier and the display instruments have not been switched on previously or which release the safety rods if the amplifier and the display instruments are switched off.

What I claim is:

1. In a nuclear reactor simulator, in combination, a model of a nuclear reactor, said model including movable control rods, an adjustable heat source, control means for the heat source operatively coupled to said movable control rods, a heat sensitive transistor circuit having its transistor exposed to the heat source, and display means comprising at least a meter arranged to indicate the response of the transistor circuit to the heat source as an indication of the response of a nuclear reactor to the positions of its control rods.

2. A nuclear reactor simulator according to claim 1 in which the heat source is an incandescent lamp.

3. In a nuclear reactor simulator according to claim 2, color filters arranged between the incandescent lamp and the reactor model whereby the illumination of the model simulates the Tcherenkow-radiation glow of a nuclear reactor.

4. In a nuclear reactor simulator according to claim 1, movable model parts representing an adjustable neutron source, second control means for the heat source, and coupling means connecting the second control means to said movable model parts.

5. In a nuclear reactor simulator according to claim 4, means for shielding the coupling means from view.

6. In a nuclear reactor simulator according to claim 1, alarm means operatively connected to said transistor circuit and arranged to operate whenever the transistor circuit simulates a dangerous operation of a real reactor.

7. In a nuclear reactor simulator according to claim 6, safety rods in the model, and means responsive to operation of the alarm means for moving the safety rods.

8. In a nuclear reactor according to claim 6, switching means responsive to the alarm means connected to the heat source to deenergize the heat source upon operation of the alarm means.

References Cited in the file of this patent

UNITED STATES PATENTS

| | | |
|---|---|---|
| 2,871,376 | Kretzmer | Jan. 27, 1959 |
| 2,932,714 | Merrill | Apr. 12, 1960 |
| 2,957,081 | Chapman | Oct. 18, 1960 |